Figure 1:
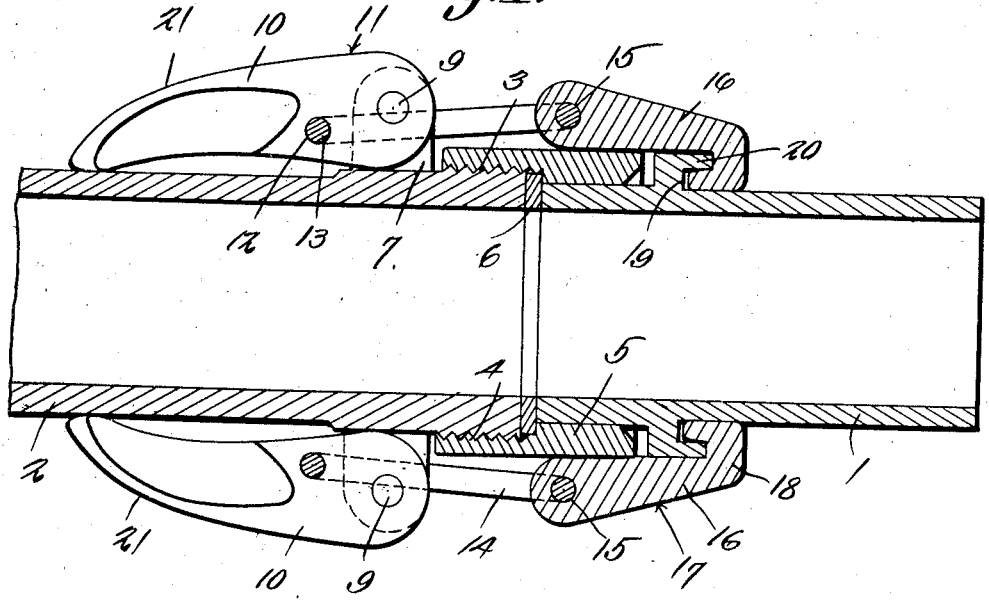

V. E. LINDFORS.
HOSE OR PIPE CONNECTION.
APPLICATION FILED DEC. 1, 1919.

1,331,715.

Patented Feb. 24, 1920.

V. E. Lindfors
Inventor,
By C. A. Snow & Co.
Attorneys.

Witness

UNITED STATES PATENT OFFICE.

VICTOR E. LINDFORS, OF BUTTE, MONTANA, ASSIGNOR OF ONE-HALF TO JACOB KNUTTILA, OF BUTTE, MONTANA.

HOSE OR PIPE CONNECTION.

1,331,715.  Specification of Letters Patent.  Patented Feb. 24, 1920.

Application filed December 1, 1919. Serial No. 341,641.

*To all whom it may concern:*

Be it known that I, VICTOR E. LINDFORS, a citizen of the United States, residing at Butte, in the county of Silverbow and State of Montana, have invented a new and useful Hose or Pipe Connection, of which the following is a specification.

This invention relates to new and useful improvements in couplings and more particularly to pipe couplings known as detachable couplings.

The primary object of the invention is to provide a pipe coupling including opposed pipe carrying sections, and means for securing the sections together.

A further object of the invention is to provide means for moving the sections of the coupling toward each other, to eliminate the possibility of fluid leaking from the coupling at the points of connection between the sections thereof, the means acting as a lock for retaining the sections in their assembled positions.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 2:
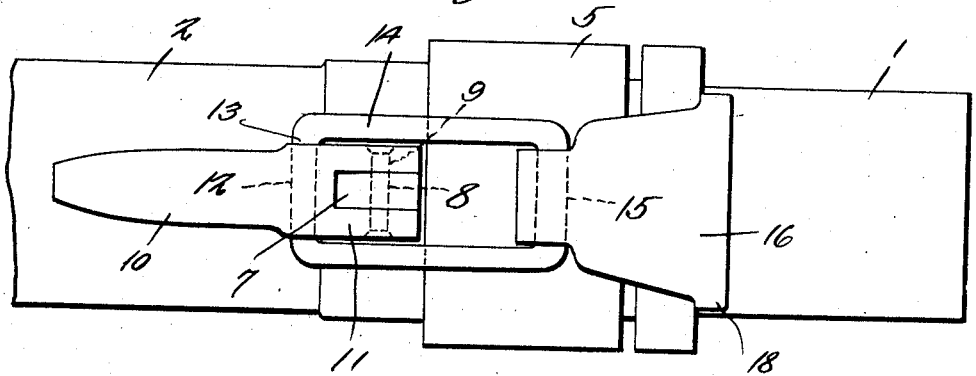

Figure 1 illustrates a longitudinal sectional view through a coupling constructed in accordance with the present invention, and Fig. 2 illustrates a plan view of the same.

Referring to the drawing in detail, the coupling includes opposed sections 1 and 2, each of which is preferably tubular, the section 1 being the main, or body portion of the coupling and is provided with the external screw threads 3, extending from one of the ends thereof, and terminating at a predetermined distance from the end to receive the threads 4 formed interiorly of the collar 5, which collar is provided with an annular shoulder portion formed intermediate its length, for the reception of a washer 6 forming an abutment for one end of the opposed section 2 to be hereinafter more fully described, the collar however having a portion thereof embracing one extremity of the section 2, as disclosed by Fig. 1 of the drawing.

The main section 1 is provided with laterally extending ears 7 formed on opposite sides thereof, the ears being provided with the openings 8, which openings accommodate the pivot pin 9 for providing a bearing or support for the levers 10. These levers 10 are each provided with a bifurcated end 11 contacting with the side faces of the ears 7, the pivot pin 9 passing through suitable openings in the levers 10 for connecting the levers to the ears.

Each of these levers is provided with a transversely extending opening 12, disposed therein adjacent the pivoted end thereof, and is provided for the purpose of accommodating the end 13 of the connecting link 14, the opposite end of said connecting link 14, extending through the opening 15, formed in the lower extremity of the clamping member 16 to which the same is applied, the clamping member having a beveled outer surface 17 and a hooked portion 18 of a size to properly fit within the groove 19 formed by the annular shoulder 20, carried by the section 2 of the coupling.

It might be further stated that the outer surface of each of the levers 10 curves toward the free end of the body of the coupling, as at 21, so that the same will present a camming surface to permit the coupling to slide easily over the surface on which the coupling is positioned, in the event that the coupling is employed for connecting sections of a hose, which is in use, dragged or moved along the ground surface.

In operation, when the coupling is employed for connecting sections of hose, the levers 10 are moved to permit the clamping members to be positioned within the groove 19, whereupon the levers are moved to a position in parallel relation with the main section 1, which movement causes the section 2 of the coupling to move into engagement with the washer 6, whereupon the sections of the coupling are locked into close engagement with each other, it being understood however, that the remaining portions of the sections or free ends thereof, accommodate the hose sections to be coupled, by the device.

Having thus described the invention, what is claimed is:—

In a pipe coupling, a main section having a threaded end, a collar having a threaded portion positioned on the threaded end, said collar having an internal annular groove, a washer in the groove, a section having one of its ends positioned within the collar and abutting the washer, levers controlling clamping members, carried by the main section, and means carried by the opposite section coöperating with the clamping members for moving the sections toward each other when the levers are moved to a position in parallel relation with the side walls of the main section.

In testimony that I claim the foregoing as my own, I have hereto affixed my signature in the presence of two witnesses.

VICTOR E. LINDFORS.

Witnesses:
JACOB KNUTTILA,
JOSEPH J. MCCAFFERY.